United States Patent [19]
Bartlett et al.

[11] Patent Number: 5,199,756
[45] Date of Patent: Apr. 6, 1993

[54] LOCKING TONGS

[75] Inventors: Laurence Bartlett, Colchester; Robert DeGuise, Milton, both of Vt.

[73] Assignee: Edlund Company, Inc., Burlington, Vt.

[21] Appl. No.: 842,891

[22] Filed: Feb. 27, 1992

[51] Int. Cl.⁵ .................. A47G 21/10; A47J 43/28
[52] U.S. Cl. .................................. 294/16; 294/28; 294/99.2; 294/106
[58] Field of Search .................. 294/3, 5, 7, 8, 8.5, 294/11, 16, 33, 28-31.1, 82.32, 99.2, 100, 85, 106, 110.1, 115-117

[56] References Cited

U.S. PATENT DOCUMENTS

| | | | |
|---|---|---|---|
| 852,479 | 5/1907 | Weiss | 294/99.2 X |
| 1,387,917 | 8/1921 | Bowe | 294/115 |
| 2,800,356 | 7/1957 | Benton | 294/106 |
| 2,864,645 | 12/1958 | Meldrum | 294/106 |
| 3,084,893 | 4/1963 | Ruth | 294/85 X |
| 3,211,488 | 10/1965 | Duranel | 294/116 |

FOREIGN PATENT DOCUMENTS

| | | | |
|---|---|---|---|
| 284150 | 5/1915 | Fed. Rep. of Germany | 294/82.32 |
| 86255 | 5/1936 | Sweden | 294/82.32 |
| 1437340 | 11/1988 | U.S.S.R. | 294/116 |
| 177367 | 3/1922 | United Kingdom | 294/11 |

*Primary Examiner*—Johnny D. Cherry
*Attorney, Agent, or Firm*—Collard & Roe

[57] ABSTRACT

A pair of locking tongs for grasping items which includes two arms, each with a hinge end and a grasping end. A hinge pin is provided for pivotally connecting the two arms together at their hinge ends so that the arms can pivot between an open and closed position. A locking plate is provided for locking the arms in the closed position slidably disposed at the hinge ends of the arms. The locking plate is movable from a first unlocked position to a second locked position whereby the locking plate engages the hinged ends of the arms and prevents the arms from opening.

9 Claims, 3 Drawing Sheets

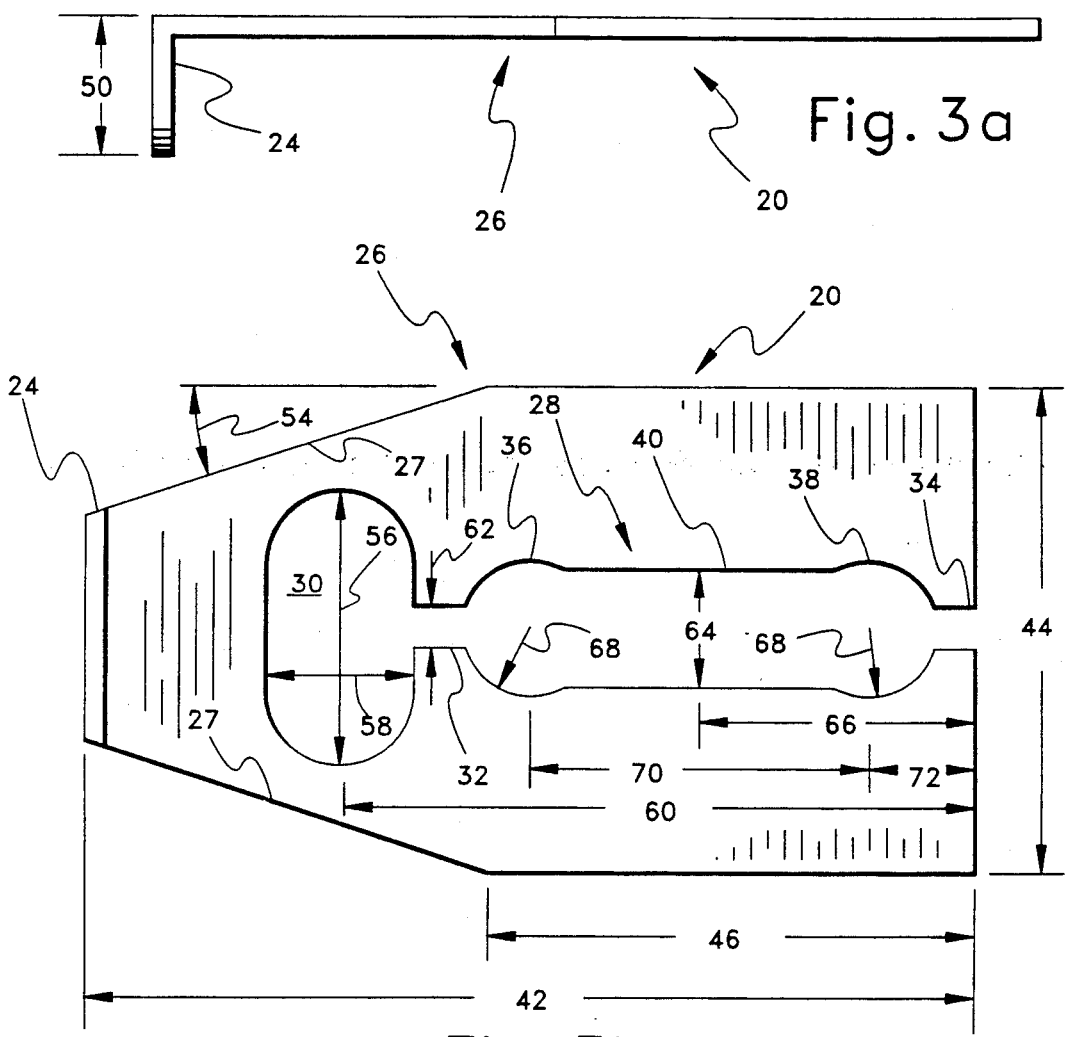
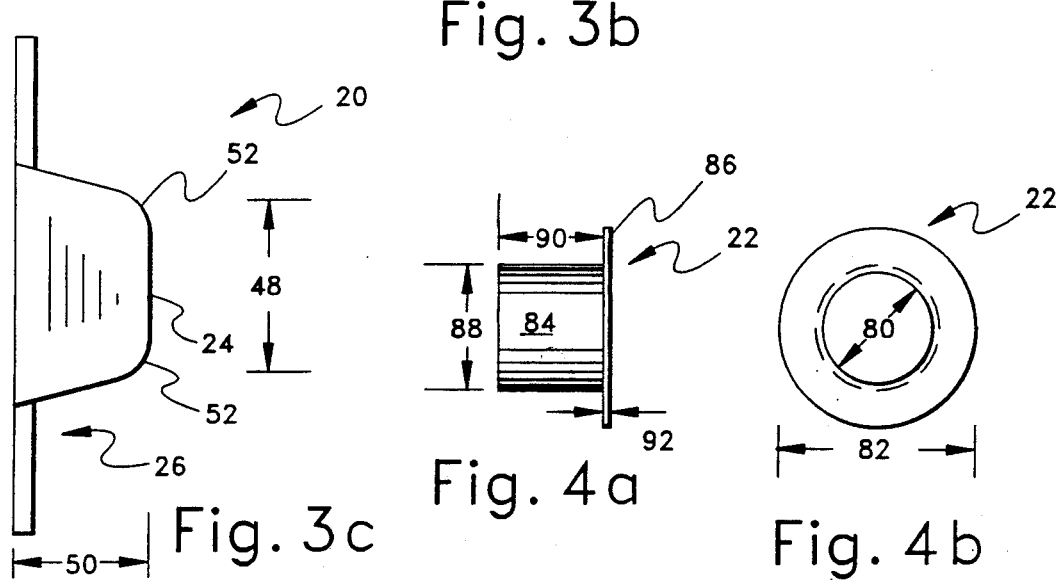

LOCKING TONGS

BACKGROUND OF THE INVENTION

1. Field of the Invention

The present invention relates to locking tongs which can be locked in the closed position. More specifically, it relates to locking tongs having a locking clip installed at the pivot or hinge point which can be moved into a locked position so that the tongs are held closed.

2. Prior Art

Tongs are known which consist of two arms joined at one end by a pivot or hinge. Such devices are used to grasp food or other items where it is preferable to avoid contact by hands, for sanitary, safety or other reasons. For example, tongs can be used to serve very hot food items which would otherwise burn one's hand. Also, tongs could be used to serve food and would provide greater sanity than if the server's hands were used.

The tongs of the prior art have one significant disadvantage in that tongs which include a spring to bias the two arms in an open position are cumbersome to clean and store. For example, tongs which are biased in the open position will not fit easily into a dishwasher or storage drawer. Tongs which are equipped with springs could be easily cleaned and/or stored if they could be held in the closed position when not being used. One method to hold tongs in the closed position is to place a rubber band over the end of the arms. However, a rubber band is not dishwasher safe and would probably melt in the heat of the dishwasher. Also, rubber bands are not ordinarily sanitary and, therefore, it is not desirable to place them in contact with food serving utensils. Lastly, tongs which are held closed by a rubber band and placed in a drawer may snap open if the rubber band breaks and can create a situation in which the opened tongs jam against the inside of cabinet and prevent the drawer from being opened.

SUMMARY OF THE INVENTION

Accordingly, it is an object of the present invention to provide tongs which overcome the drawbacks of the prior art and which can be locked in the closed position.

It is a further object of the invention to provide tongs which can be conveniently stored.

These and other objects are achieved according to the invention by tongs for grasping items which have two arms, each with a hinge end and a grasping end. Hinge means are provided for pivotally connecting the two arms together at their hinge ends, so that they can pivot between an open position and a closed position. Locking means in the form of a locking plate is provided for locking the arms in the closed position, slidably disposed at the hinge ends of the arms. The locking plate is movable from a first unlocked position to a second locked position, whereby the locking plate engages the hinge ends and prevents them from opening.

The locking plate is generally in the form of the longitudinally extending plate mounted on the hinge pin or axis between the hinge ends of the two arms. The plate has a top end and a bottom end, with the longitudinally extending slot being placed generally closer to the bottom end of the plate than to the top end of the plate. Also, a transverse slot is disposed on the top end of the plate. The transverse slot is oriented perpendicular to the longitudinally extending slot. A connecting slot is provided which joins the transverse slot to the longitudinally extending slot. Also, an end slot is provided disposed at the bottom end of the plate, connected to the longitudinally extending slot.

The longitudinally extending plate also includes a handle attached to the top end of the plate and generally disposed perpendicular to the plate. Pressure on the handle in a longitudinal direction moves the plate in a longitudinal direction between the unlocked position and the locked position. Since the locking plate frictionally engages the hinge pin or axis, significant force may be required to overcome the frictionally forces and move the plate. Thus, it would be difficult to grab the plate itself and slide it. The handle provides two flat surfaces on which pressure can be exerted to slide the locking plate.

The longitudinal slot has ends which are generally rounded in order to accommodate the hinge. The longitudinally extending slot has a width generally narrower than the diameter of the hinge. The interconnection of the transverse slot, the connecting slot, the longitudinally extending slot and the end slot cooperate to frictionally engage the hinge and cause an outward flexing of the longitudinally extending plate when the hinge is slid between one end of the slot and the other end of the slot. Thus, the entire locking plate clips on to the hinge means. The interconnection of slots removes material along a substantial central region of the locking plate making it flexible.

The longitudinally extending plate has a narrow or converging top, allowing the arms to freely pivot between the open and closed positions when the locking means is in the unlocked position. The plate has a rectangular bottom which prevents the hinged ends of the tongs from pivoting towards each other, thus maintaining the tongs in the closed position.

The longitudinally extending plate may be made of a variety of rigid materials, such as stainless steel, aluminum, etc. Also, the various slots cut into the plate can be varied. As long as the plate exerts tension on the hinge ends of the arms, the tongs can be locked in the closed position. A spring may be attached to the hinge to bias the tongs in an open position. The ends of the hinge pin may be hammered over or provided with a cap to keep the hinge pin attached to the arms, as is well known in the art.

BRIEF DESCRIPTION OF THE DRAWINGS

Other objects and features of the present invention will become apparent from the detailed description considered in connection with the accompanying drawings, which disclose one embodiment of the invention. It is to be understood, however, that the drawings are to be used for the purpose of illustration only, and not as definition of the limits of the invention.

In the drawings, wherein similar reference characters denote similar elements throughout the several views:

FIG. 3a is a side elevational view of the locking clip;

FIG. 3b is a top plan view of the locking clip;

FIG. 3c is a left side view of the locking clip;

FIG. 4a is a side elevational view of a bushing; and

FIG. 4b is a top plan view of the bushing.

DETAILED DESCRIPTION OF THE PREFERRED EMBODIMENT

Figure 1:
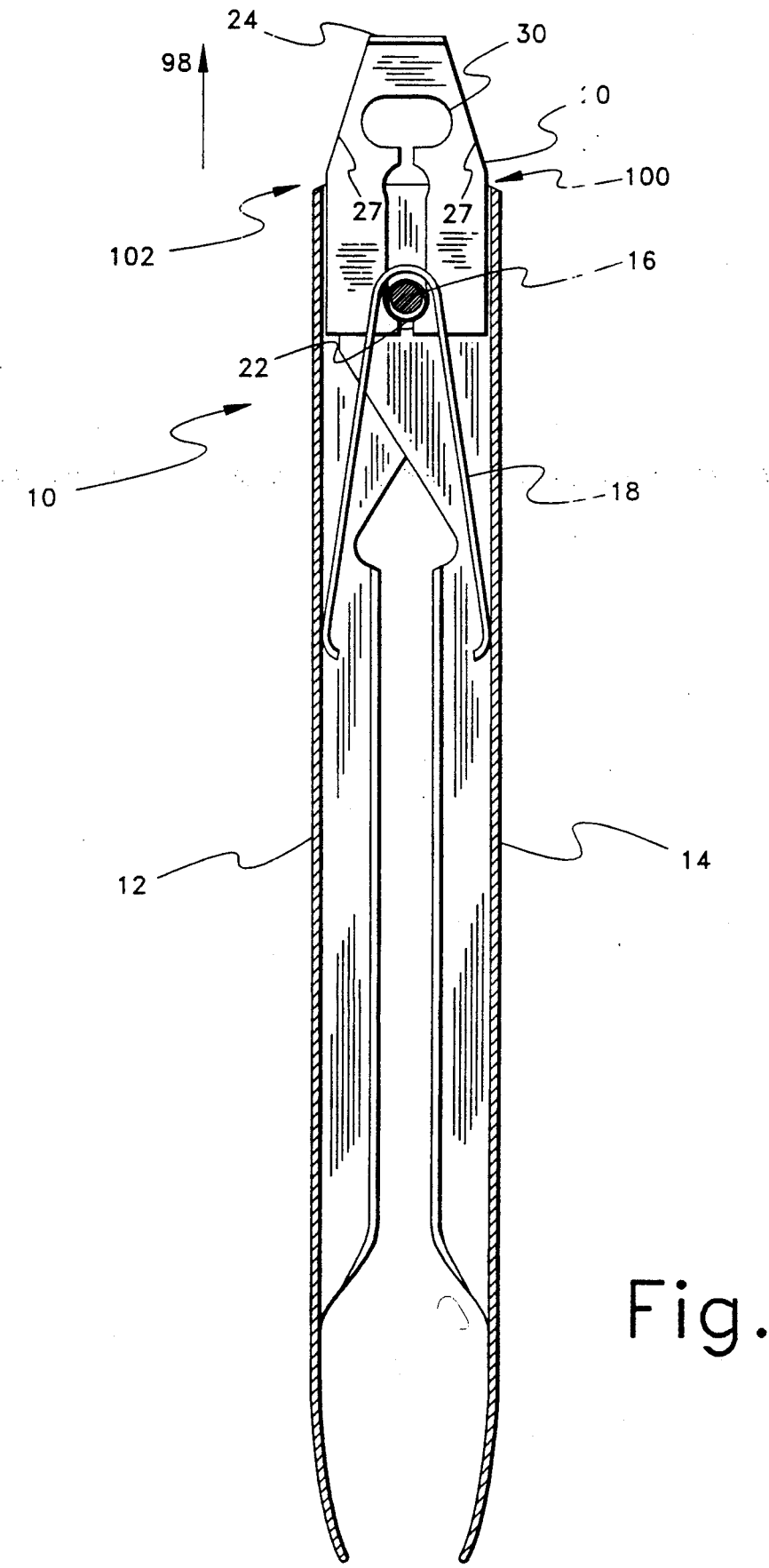
FIG. 1 is a side elevational view in cross-section of the locking tongs in the closed position according to the invention.
Figure 2:
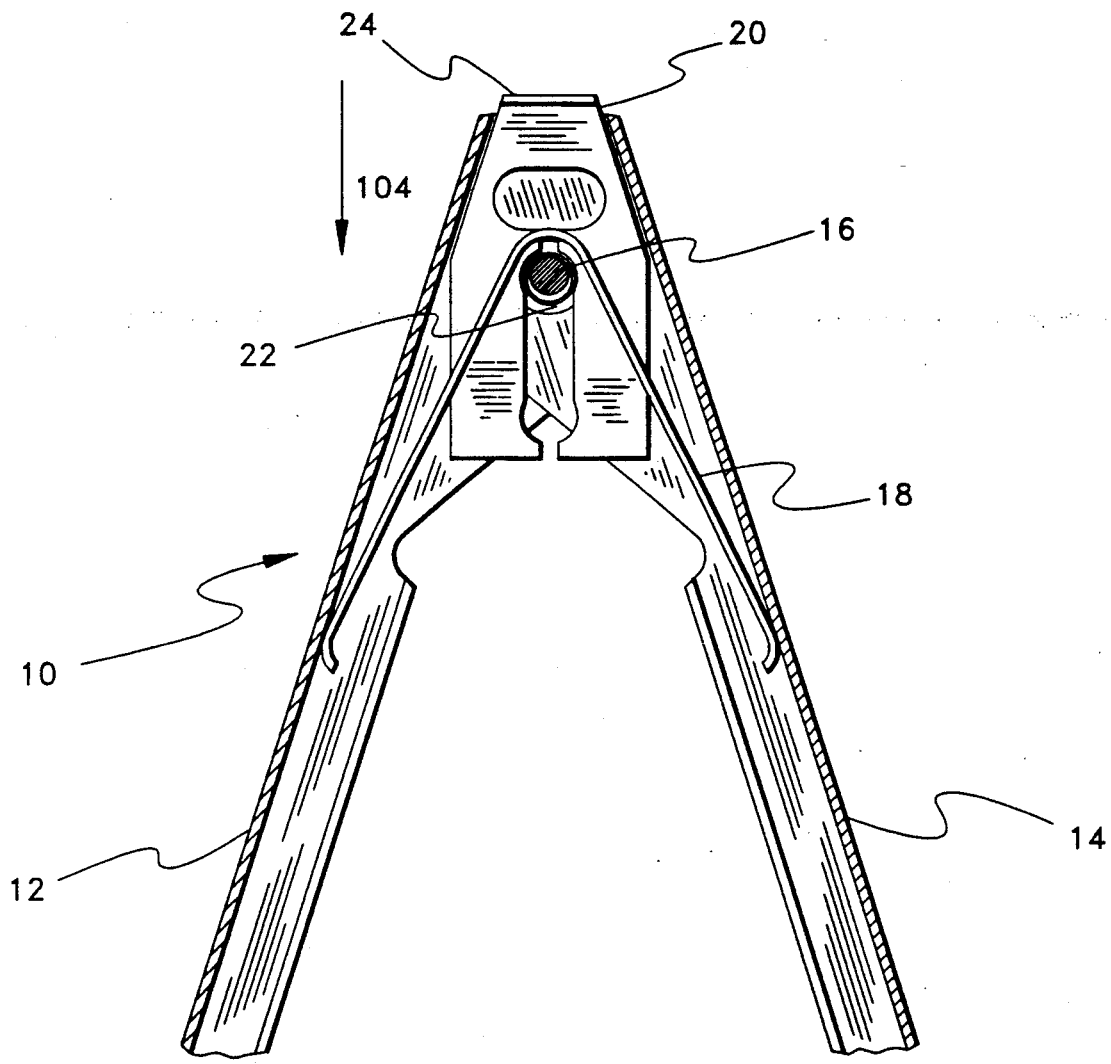
FIG. 2 is a side elevational view in cross-section of the locking tongs of FIG. 1 in the open position.

Referring now in detail to the drawings, and in particular to FIGS. 1 and 2, locking tongs 10 are shown having a left arm 12 and a right arm 14. Arms 12 and 14 are joined at one end by a hinge pin 16. As seen in FIG. 2, spring 18 is also connected at the hinge point and biases arms 12 and 14 into the open position. A locking clip 20 is provided which rides along hinge pin 16. A bushing 22 may optionally be provided as a wear surface for the edge of locking clip 20.

As seen in FIG. 2, locking tongs 10 are biased in the open position by spring 18. In order to use the tongs, arms 12 and 14 are placed on either side of the item to be grasped, and pressure is applied to arms 12 and 14 to close the tongs against the biasing force of spring 18. When sufficient pressure has been applied to grasp and hold the food item, it can be lifted or moved from a serving dish to an individual's plate, for example. Hand pressure is gradually released from arms 12 and 14, allowing the tongs to return to their open position thus releasing the food item.

When the tongs are in their closed position, locking clip 20 can be moved from the unlocked position to the locked position. FIGS. 3a, 3b and 3c show locking clip 20 in detail. The top end of locking clip 20 is provided with a tab or flange 24, which is bent perpendicular to a main body 26 of clip 20, for example. Tab 24 can be used to grasp and slide locking clip 20 between its locked and unlocked positions. Body 26 of locking clip 20 is provided with a longitudinal slot 28 and a transverse slot 30 which is oriented perpendicular to longitudinal slot 28. Longitudinal slot 28 and transverse slot 30 are connected to each other by a connecting slot 32. Longitudinal slot 28 has enlarged openings 36 and 38 at each end. A narrow end slot 34 communicates longitudinal slot 28 to the end of body 26. The two enlarged openings 36 and 38, with respect to hinge pin 16, define the unlocked and lock positions, respectively, and are connected by a narrower central slot 40. Unlocked opening 36 and locked opening 38 define the terminal points of travel for hinge pin 16. Hinge pin 16 moves between openings 36 and 38 by sliding through central slot 40.

The diameter of openings 36 and 38 can be equal to or slightly smaller than the outside diameter of hinge 16, so that locking clip 20 firmly grips hinge 16. The series of slots, including transverse slot 30, connecting slot 32, longitudinal slot 28 and end slot 34, permit locking clip 20 to act as a spring which is opened slightly when mounted on hinge 16. The diameter of central slot 40 is slightly narrower than openings 36 and 38 and, as a result, locking clip 20 is forced further open as hinge 16 passes through central region 40. As hinge 16 emerges from central region 40 into either opening 36 or 38, locking clip 20 clicks into the terminal position and prevents hinge pin 16 from returning to central slot 40 unless a sufficient force is applied to tab 24.

In a preferred embodiment, locking clip 20 has an overall length 42 of 1-5/16 inches and an overall width 44 of 0.718 inches. Longitudinal slot 30, connecting slot 32, longitudinal slot 28 and end slot 34 may be centered on locking clip 20 with respect to overall width 44. Body 26 has a length 46 of 23/32 of an inch. Tab 24 has a tab width 48 of ¼ inches at its free end and a tab height 50 of 0.200 inches. Tab 24 has tab edges 52 which have a 1/16 inch radius. Body 26 tapers down to tab 24 by angle 54 which is 18 degrees. Transverse slot 30 has a width 56 of 13/32 of an inch and a height 58 Of 7/32 Of an inch. The center point of transverse slot 30 is located a distance 60 from the edge of locking clip 20 which is 15/16 of an inch.

Connecting slot 32 has a width 62 of 1/16 of an inch. Central slot 40 of longitudinal slot 28 has a width 64 of 0.176 inches. A distance 66 from the mid point of central region 40 to the end of locking clip 20 is 0.406 inches. Central region 40 is adjacent to openings 36 and 38, which are rounded and have a radius 68 of 0.101 inches. A distance 70 between center points of openings 36 and 38 is ¼ inch. A distance 72 from the center point of opening 38 to the end of locking clip 20 is 5/32 of an inch.

Locking clip 20, for example, may be formed from 0.030 stainless steel, ¼ hard safety edge type 303 or 301. The tolerances on fractional dimensions given above is +/−1/64 of an inch. The tolerances on decimal dimensions given above is +/−0.005 inches. However, distance 70 between openings 36 and 38 has a tolerance of +/−0.001 inches. Locking clip 20 may also be fabricated from plastic, sheet metal, wire, or a combination of materials, as long as clip 20 has the longitudinal shaped slots and acts as a spring to flex outward as locking clip 20 is moved along hinge pin 16 from opening 36 to 38. If locking clip 20 has sharp edges along longitudinal slot 28, then a bushing 22 may also be provided on hinge pin 16 as a wearing surface. If locking clip 20 has a smooth edge or is made of soft plastic material, then only minimum wear would be evident and bushing 22 would not be necessary.

Bushing 22, as seen in FIG. 4a and 4b, would have an inside diameter 80 of 0.162 inches and an outside diameter 82 of 0.290 inches. Bushing 22 would be provided with a wear surface 84 which would travel within longitudinal slots 28 and a collar 86 to prevent bushing 22 from sliding out of locking clip 20. Wear surface 84 would have a wear surface diameter 88 of 0.183 inches and a length 90 of between 0.156 inches and 0.250 inches. Collar 86 has a width 92 of 0.0105 inches. Tolerances on fractional dimensions are +/−1/64 of an inch and tolerances on decimal dimensions are +/−0.005 inches. Bushing 22 can be made, for example, of 304 stainless steel.

When hinge pin 16 is in the unlocked position in opening 36, as seen in FIG. 2, handles 12, 14 can move freely and are unaffected by locking clip 20. Angle 54 of locking clip 20 generally conforms to the angle established between arms 12 and 14 in the fully opened position. However, locking clip 20 can be of a smaller angle. The edges of arms 12 and 14 (not shown for reasons of clarity) can fold around locking clip 20 and contact each other to prevent the tongs from opening beyond a predetermined point. Locking clip 20 can be used as a stop against which arms 12 and 14 can rest to prevent further opening. Arms 12 and 14 can move unhindered when locking clip 20 is in unlocked position in opening 36. When it is desired to lock tongs 10, arms 12 and 14 are closed, as shown in FIG. 1, and tab 24 is grasped and locking clip 20 is slid in direction 98, causing locking clip 20 to expand as hinge 16 leaves the unlocked position in opening 38 and enters central region 40. When the locked position in opening 38 is reached, locking clip 20 snaps closed as hinge pin 16 is released from central region 40. In this position, the ends 102 and 100 of arms 12 and 14 contact edges of clip 20 and are restricted from opening. Tongs 10 will remain in the closed position and can be placed in a dishwasher or in a drawer. Tongs 10 may also be hung up by placing transverse slot 30 over a nail or hook.

Locking tongs 10 will remain in the closed position until sufficient downward pressure is exerted on locking clip 20 in direction 104 to move hinge pin 16 out of the locked position in opening 38 into central region 40. When hinge 16 reaches the unlocked position in opening 36, as seen in FIG. 2, locking clip 20 snaps closed as the hinge pin exits central region 40. Arms 12 and 14 can then open and separate 30°-50° apart until arm ends 102 and 100 contact angled surfaces 27 of clip 20. Obviously, in the design of clip 20, if angle 54 is increased so that the convergence of surfaces 27 increases, tong arms 12 and 14 will open wider. Tongs 10 are now ready for use.

While only one embodiment of the present invention has been shown and described, it is obvious that many changes and modifications may be made thereunto without departing from the spirit and scope of the invention.

What is claimed is:

1. Locking tongs for grasping items, comprising:
   two arms, each with a hinge end and a grasping end;
   hinge means for pivotally connecting said two arms together at their hinge ends, so that said arms can pivot between an open position and a closed position; and
   locking means slidably disposed at the hinge ends of said two arms, wherein in a first position said locking means engage said hinge ends of said two arms and prevent said arms from pivoting to an open position, and wherein in a second position said locking means disengage said hinge ends of said two arms and allow said arms to pivot freely, said locking means include a longitudinally extending plate mounted on said hinge means between the hinge ends of said two arms having a top end, a bottom end, and a longitudinally extending slot, the longitudinally extending slot being located adjacent to the bottom end of said plate, said longitudinally extending plate additionally includes a transverse slot located adjacent to the top end of said plate, said transverse slot is oriented perpendicular to said longitudinally extending slot, said longitudinally extending plate additionally includes a connecting slot which joins said transverse slot to said longitudinally extending slot and an end slot disposed at said bottom end of said plate and connected to said longitudinally extending slot.

2. The tongs according to claim 1, wherein said longitudinally extending plate additionally includes a handle attached to said top end of said longitudinally extending plate and generally disposed perpendicular to said longitudinally extending plate, whereby pressure on said handle in the longitudinal direction moves said locking means in a longitudinal direction between the first and second positions.

3. The tongs according to claim 2, wherein said longitudinally slot has an elongated rectangular shape with rounded ends to accommodate said hinge means.

4. The tongs according to Claim 3, wherein said longitudinally extending slot has a width generally narrower than the diameter of said hinge means and, wherein, said transverse slot, said connecting slot, said longitudinally extending slot and said end slot cooperate to frictionally engage said hinge means when said hinge means is slid between one end of the longitudinally extending slot and the other end thereof.

5. The tongs according to claim 4, wherein said longitudinally extending plate has a narrow top allowing said arms to freely pivot between the open and closed position when said locking means is in the second position, and a rectangular bottom end which engages and prevents said hinge ends of said two arms from pivoting towards each other, thus maintaining the tongs in the closed position.

6. The tongs according to claim 5, wherein said hinge means comprises a pin pivotably joining the hinge ends of said arms.

7. The tongs according to claim 6, wherein said hinge pin additionally comprises a bushing surrounding said pin.

8. The tongs according to claim 1, additionally including spring means for biasing said two arms in the open position, said spring means being attached to said hinge means.

9. The tongs according to claim 1, wherein said plate has a V-shaped top end for engaging the hinge ends of said arms to prevent further opening.

* * * * *